United States Patent
Veerepalli et al.

(10) Patent No.: US 7,069,015 B2
(45) Date of Patent: Jun. 27, 2006

(54) METHOD AND APPARATUS FOR CONSERVING HOME AGENT RESOURCES IN MOBILE IP DEPLOYMENT

(75) Inventors: Sivaramakrishna Veerepalli, Poway, CA (US); Marcello Lioy, San Diego, CA (US); Nischal Abrol, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 640 days.

(21) Appl. No.: 10/076,148

(22) Filed: Feb. 14, 2002

(65) Prior Publication Data

US 2003/0153324 A1 Aug. 14, 2003

(51) Int. Cl.
*H04Q 7/20* (2006.01)

(52) U.S. Cl. ............... 455/453; 455/435.1; 455/432.1; 370/400; 709/226

(58) Field of Classification Search ............... 455/453, 455/435.1, 432.1, 433, 450, 452.1, 436, 458, 455/426.1; 370/351, 352, 328, 356, 400, 370/401; 709/227, 228, 229, 226, 224

See application file for complete search history.

(56) References Cited

U.S. PATENT DOCUMENTS

| 6,707,809 | B1* | 3/2004 | Warrier et al. ............... 370/351 |
| 6,728,718 | B1* | 4/2004 | Banerjee et al. ............ 709/239 |
| 6,771,623 | B1* | 8/2004 | Ton ............................. 455/433 |
| 6,795,705 | B1* | 9/2004 | Warrier et al. ........... 455/435.1 |
| 6,795,857 | B1* | 9/2004 | Leung et al. ................ 370/401 |
| 6,892,069 | B1* | 5/2005 | Flynn ....................... 455/432.1 |
| 2001/0021175 | A1* | 9/2001 | Haverinen ................... 370/352 |
| 2002/0067704 | A1* | 6/2002 | Ton ............................. 370/352 |
| 2002/0114323 | A1* | 8/2002 | Chowdhury et al. ........ 370/352 |
| 2003/0153324 | A1* | 8/2003 | Veerepalli et al. .......... 455/453 |
| 2003/0153325 | A1* | 8/2003 | Veerepalli et al. .......... 455/453 |
| 2003/0169713 | A1* | 9/2003 | Luo ........................... 370/351 |
| 2003/0182433 | A1* | 9/2003 | Kulkarni et al. ............ 709/228 |

FOREIGN PATENT DOCUMENTS

| WO | 01/05171 | * | 1/2001 |
| WO | 01/31952 | * | 5/2001 |

* cited by examiner

*Primary Examiner*—Rafael Perez-Gutierrez
(74) *Attorney, Agent, or Firm*—Philip Wadsworth; Sandra L. Godsey; Sandra L. Godsey

(57) ABSTRACT

A method and apparatus for conserving home agent resources in mobile Internet Protocol (IP) deployment is disclosed. In a wireless communication system supporting mobile IP, a registration request message is sent by a mobile node to a home agent. The registration request includes a care-of address. A home address is provided for the mobile node and is associated with the care-of address. The home agent provides an inactivity timer for the mobile node to monitor the communication activity of the mobile node. In addition, the home agent monitors a condition of a resource. When the condition satisfies an overload condition, the home agent starts a reclaiming resources process that utilizes the inactivity timer for the mobile node.

43 Claims, 12 Drawing Sheets

| TYPE 602 | LENGTH 604 | SEQUENCE NUMBER 606 |
| LIFETIME 608 | FLAGS 610 | RES. 614 |
| CARE-OF ADDRESSES 612 | | |

FIG. 6

| IP HEADER FIELDS 702 | UDP HEADER 704 | MOBILE IP MESSAGE HEADER 706 | EXTENSIONS 708 |

| TYPE 802 | FLAGS 804 | LIFETIME 806 |
|---|---|---|
| HOME ADDRESS 808 | | |
| HOME AGENT 810 | | |
| CARE-OF ADDRESS 812 | | |
| IDENTIFICATION 814 | | |
| EXTENSIONS 816 | | |

FIG. 9

| TYPE 902 | CODE 904 | LIFETIME 906 |
|---|---|---|
| HOME ADDRESS 908 | | |
| HOME AGENT 910 | | |
| IDENTIFICATION 912 | | |
| EXTENSIONS 914 | | |

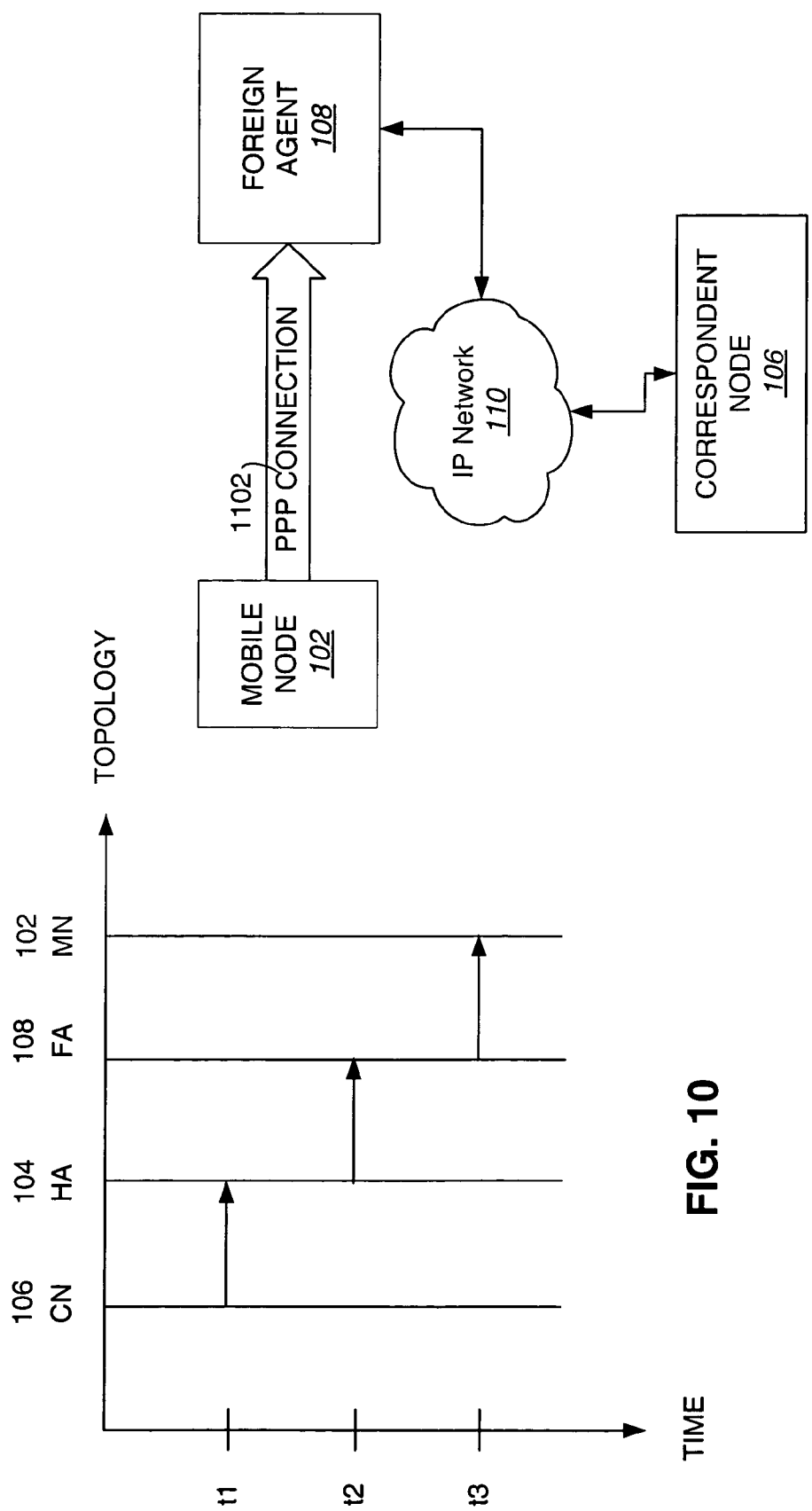

| HOME AGENT _1204_ | | | |
|---|---|---|---|
| MOBILITY BINDINGS _1206_ | | | |
| HOME ADDRESS _1208a_ | CARE-OF ADDRESS _1210a_ | LIFETIME _1212a_ | INACTIVITY TIMER _1214a_ |
| HOME ADDRESS _1208b_ | CARE-OF ADDRESS _1210b_ | LIFETIME _1212b_ | INACTIVITY TIMER _1214b_ |
| HOME ADDRESS _1208c_ | CARE-OF ADDRESS _1210c_ | LIFETIME _1212c_ | INACTIVITY TIMER _1214c_ |
| ... | ... | | |

FIG. 12

METHOD AND APPARATUS FOR CONSERVING HOME AGENT RESOURCES IN MOBILE IP DEPLOYMENT

BACKGROUND

1. Field

The present invention relates to wireless communication systems generally and specifically, to methods and apparatus for conserving home agent resources in mobile IP deployment.

2. Background

There is an increasing demand for packetized data services over wireless communication systems. As traditional wireless communication systems are designed for voice communications, the extension to support data services introduces many challenges. Specifically, the deployment of the Internet Protocol for mobile devices (referred to as "mobile IP") has a unique set of requirements and goals. Mobile IP deployment in a wireless communication system presents unique requirements and issues unlike problems faced in deploying IP in a non-mobile environment. Problems exist in mobile IP deployment in managing and conserving resources.

There is a need, therefore, for an efficient method for managing the resources in a wireless communication system implementing mobile IP.

BRIEF DESCRIPTION OF THE DRAWINGS

FIG. 6 illustrates the format for the mobility agent extension which is applied to the Agent Advertisement.

FIG. 7 is a block diagram illustrating the format of a registration message.

FIG. 8 is a block diagram illustrating the format of a registration request message.

FIG. 9 is a block diagram illustrating the format of a registration reply message.

FIG. 10 illustrates a flow diagram of the routing of data sent from a correspondent node to a mobile node.

FIG. 11 is a block diagram illustrating the routing of data sent by the mobile node to the correspondent node.

FIG. 12 is a block diagram of an embodiment of a home agent that includes mobility bindings.

DETAILED DESCRIPTION

Figure 1:
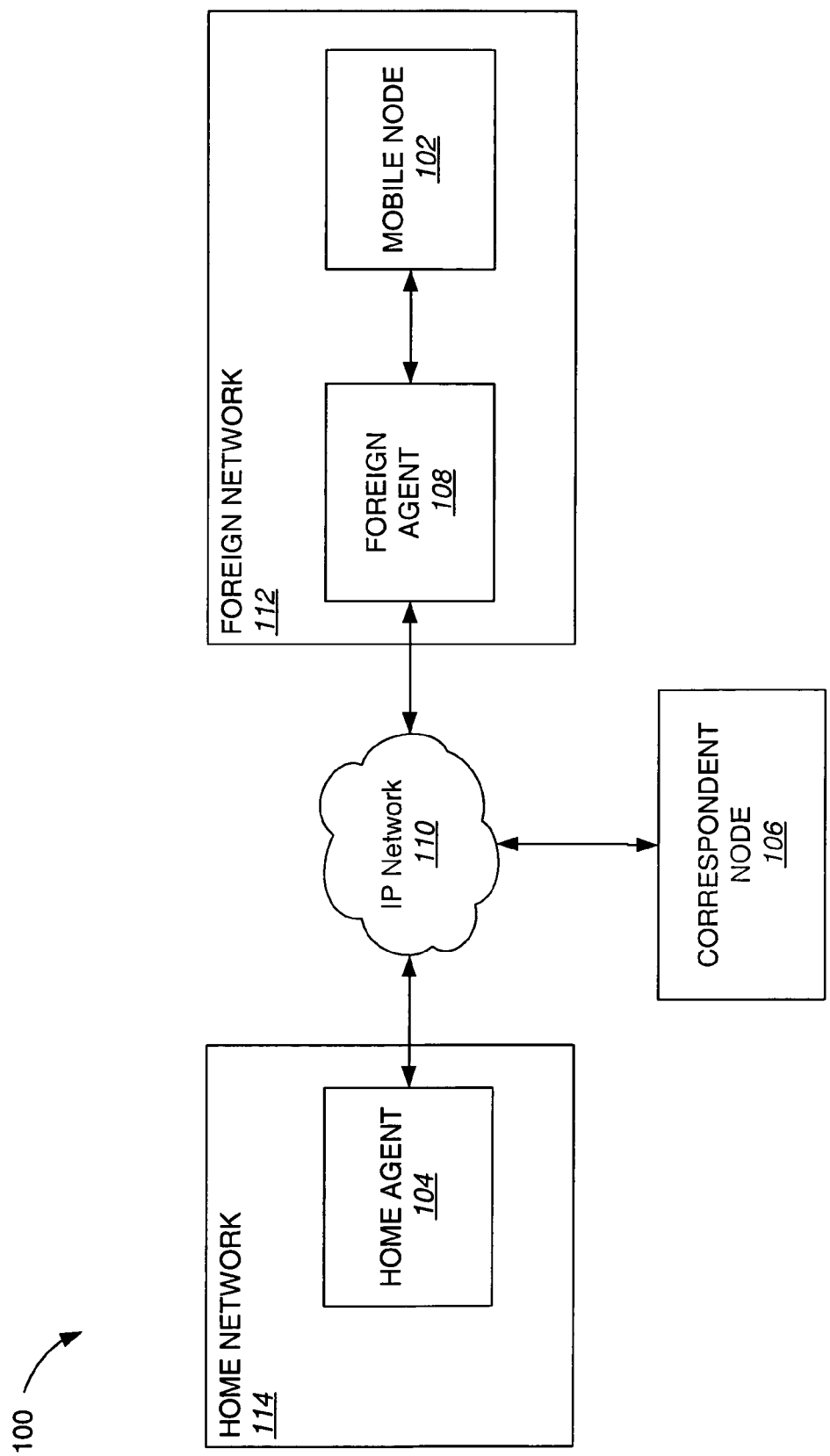
FIG. 1 is a block diagram of a communications network implementing mobile IP to enable communications with a mobile node.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments by first presenting a network implementing mobile IP to communicate data to and from a mobile node. Then a spread-spectrum wireless communication system is discussed. Next, the mobile IP network is shown implemented in the wireless communication system. The messages are illustrated that register a mobile node with a home agent thereby enabling IP data to be sent to and from the mobile node. Finally, methods for reclaiming resources at the home agent are explained.

Note that the exemplary embodiment is provided as an exemplar throughout this discussion; however, alternate embodiments may incorporate various aspects without departing from the scope of the present invention. Specifically, the various embodiments are applicable to a data processing system, a wireless communication system, a mobile IP network and any other system desiring efficient use and management of resources.

The exemplary embodiment employs a spread-spectrum wireless communication system. Wireless communication systems are widely deployed to provide various types of communication such as voice, data, and so on. These systems may be based on Code Division-Multiple Access (CDMA), Time Division Multiple Access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard.

The following definitions are used throughout the following discussion and are specific to Mobile IP communications.

Home network: The network at which the mobile node seems reachable, to the rest of the Internet, by virtue of an IP address assigned to the mobile node (i.e., the home address).

Home agent: A node on the home network that effectively causes the mobile node to be reachable at the home address of the mobile node even when the mobile node is not attached to the home network.

Home address: The IP address assigned to the mobile node, making the mobile node logically appear attached to its home network.

Care-of address: An IP address at the mobile node's current point of attachment to the Internet, when the mobile node is not attached to the home network.

Correspondent node: A node that sends or receives a packet to a mobile node; the correspondent node may be another mobile node or a non-mobile Internet node.

Foreign agent: A mobility agent on the foreign network that can assist the mobile node in receiving datagrams delivered to the care-of address.

Foreign network: The network to which the mobile node is attached when the mobile node is not attached to its home network, and on which the care-of address is reachable from the rest of the Internet.

Redirection: A message that is intended to cause a change in the routing behavior of the receiving node.

Registration: The process by which the mobile node informs the home agent about its current care-of address.

Mobile node: A node that, as part of normal use, changes the point of attachment to the Internet.

Mobility agent: A node (typically, a router) that offers support services to mobile nodes. A mobility agent can be either a home agent or a foreign agent.

FIG. 1 is a block diagram of a communications network 100 implementing mobile IP to enable communications with a mobile node 102. A home agent 104, a correspondent node 106 and a foreign agent 108 may all communicate with one another through an IP network 110. The mobile node 102 has an assigned home address that identifies the mobile node at foreign network 112 via home agent 104.

The mobile node 102 may change its location from one network or subnetwork to another. In FIG. 1 the mobile node 102 is illustrated in the foreign network 112. The mobile node 102 may obtain an IP address and communicate with other nodes, including the correspondent node 106, on the IP network 110 using its IP address. The mobile node 102 obtains an IP address from the home agent 104. The IP address from the home agent 104 may be referred to as a home address. The home address is a long-term IP address on the home network 114. When the mobile node 102 is visiting a foreign network 112, a "care-of" address (c/o address) may be associated with the mobile node 102 to reflect the mobile node's current point of attachment to the IP network 110. When sending out data, the mobile node 102 typically uses its home address as the source address for IP datagrams. (A datagram is a representation of a packet of data, which typically indicates the destination of the packet at it traverses an IP network.)

The home agent 104 is in a home network 114 of the mobile node 102 and maintains the current location information for each of its mobile nodes 102. The home agent 104 stores the information necessary to forward data to the mobile nodes 102 belonging to the home network 114. This information may be stored in mobility bindings. The mobility bindings may include a number of records that include the home address, the associated care-of address, and the lifetime of that association. The mobility bindings will be more fully discussed below in relation to FIG. 12. As will be discussed more fully in relation to FIG. 10, the home agent 104 also receives data from the correspondent node 106 and forwards the data to the intended mobile node 102.

The home network 114 has a network prefix that matches that of the mobile node's 102 home address. IP routing mechanisms operate to deliver IP data sent to a mobile node's 102 home address to the mobile node's 102 home network 114. The home network 114 may be a virtual network.

The foreign agent 108 is an agent in another network 112 (not the home network 114) where the mobile node 102 is currently located. The foreign agent 108 cooperates with the home agent 104 to deliver data to the mobile node 102 when it is out of its home network 114.

It will be appreciated by those skilled in the art that one or more intervening nodes (not shown) may be in the communication path between the home agent 104 and the foreign agent 108. The intervening nodes (not shown) may be on the IP network 110 and are typically routers. Thus, as data is sent between the home agent 104 and the foreign agent 108, it travels through and is routed by one or more intervening nodes (not shown).

The network 100 in FIG. 1 may be implemented as different kinds of networks. Those skilled in the art will appreciate the various types of networks that may benefit from the inventive principles herein. One possible network in which mobile IP and the embodiments disclosed herein may be implemented is illustrated in FIGS. 2 and 3.

Figure 2:
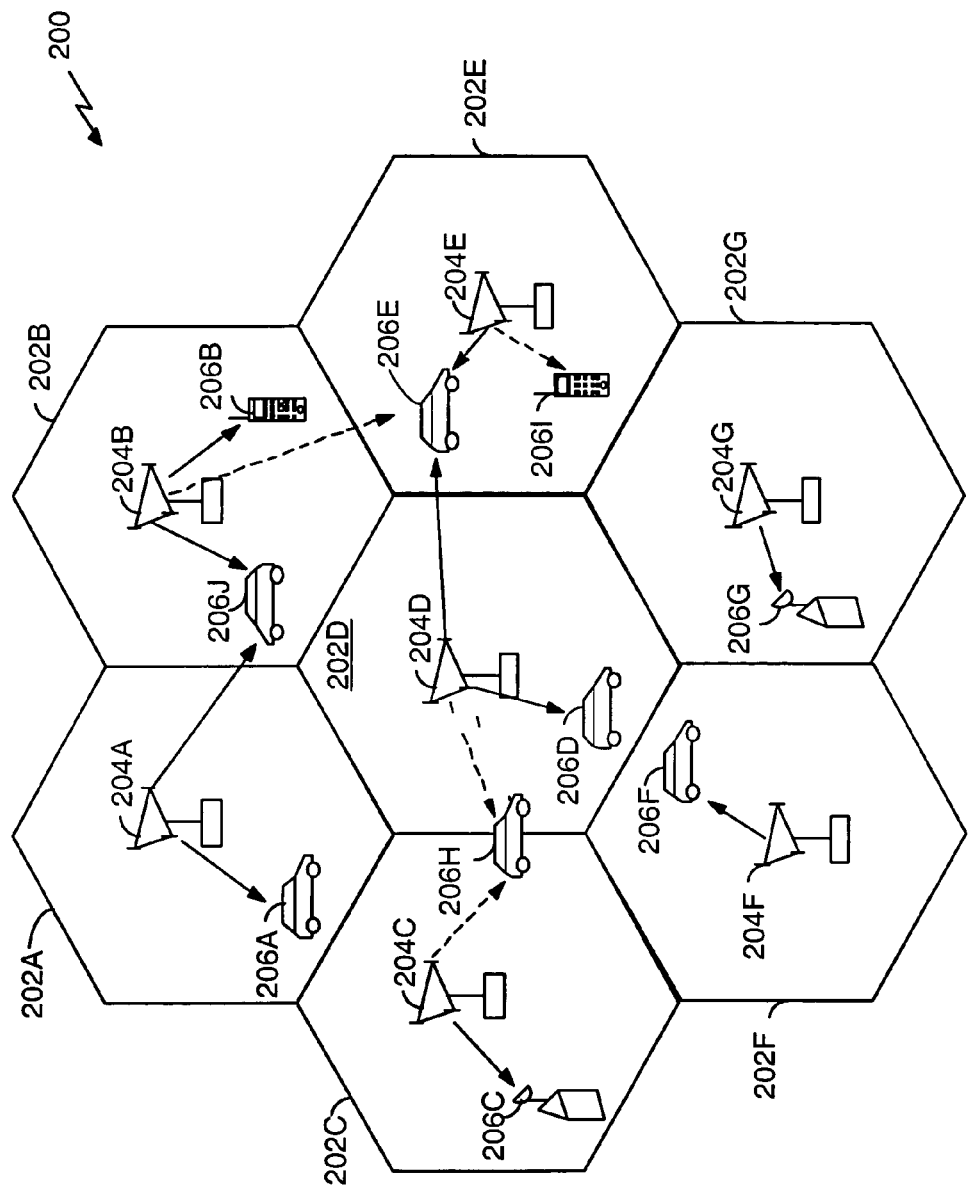
FIG. 2 is a diagram of a wireless communication system that supports a number of users.
Figure 3:
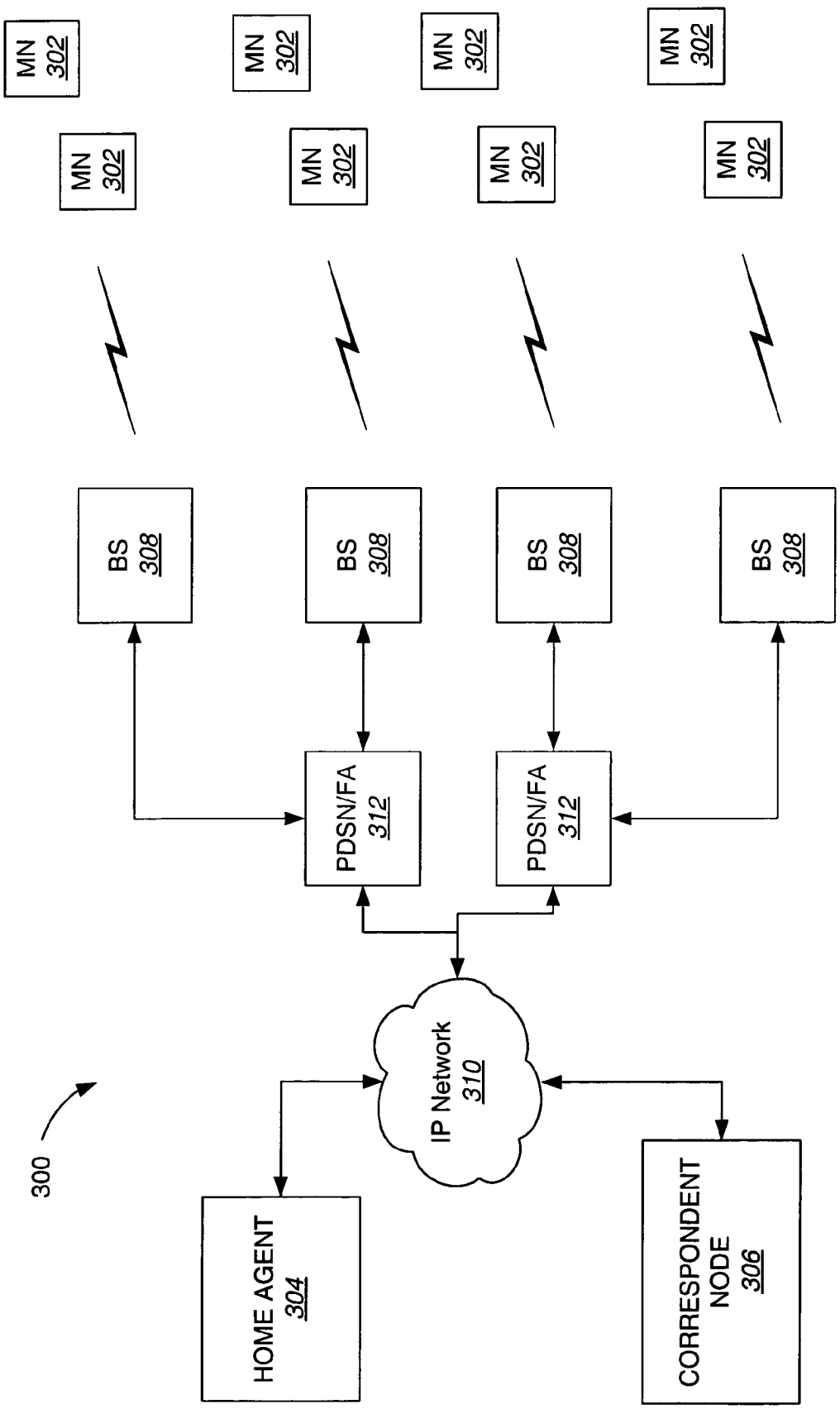
FIG. 3 is a block diagram of the communication system supporting IP data transmissions.

FIG. 2 serves as an example of a communications system 200 that supports a number of users and is capable of implementing at least some aspects of the embodiments discussed herein. Any of a variety of algorithms and methods may be used to schedule transmissions in system 200. System 200 provides communication for a number of cells 202A–202G, each of which is serviced by a corresponding base station 204A–204G, respectively. In the exemplary embodiment, some of the base stations 204 have multiple receive antennas and others have only one receive antenna. Similarly, some of the base stations 204 have multiple transmit antennas, and others have single transmit antennas. There are no restrictions on the combinations of transmit antennas and receive antennas. Therefore, it is possible for a base station 204 to have multiple transmit antennas and a single receive antenna, or to have multiple receive antennas and a single transmit antenna, or to have both single or multiple transmit and receive antennas.

Terminals 206 in the coverage area may be fixed (i.e., stationary) or mobile. The mobile node 102 of FIG. 1 may be a mobile terminal 206. As shown in FIG. 2, various terminals 206 are dispersed throughout the system. Each terminal 206 communicates with at least one and possibly more base stations 204 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System," which is assigned to the assignee of the present invention.

The downlink refers to transmission from the base station 204 to the terminal 206, and the uplink refers to transmission from the terminal 206 to the base station 204. In the exemplary embodiment, some of terminals 206 have multiple receive antennas and others have only one receive antenna. In FIG. 2, base station 204A transmits data to terminals 206A and 206J on the downlink, base station 204B transmits data to terminals 206B and 206J, base station 204C transmits data to terminal 206C, and so on.

In one possible embodiment, the components of FIG. 1 may be used and implemented in a wireless communication system as shown in FIG. 3. IP packets or IP data may be communicated via an IP network 310 between the correspondent node 306, the home agent 304 and a mobile node (MN) 302. In this embodiment 300, a Packet Data Serving Node also serves as a Foreign Agent (PDSN/FA) 312. As illustrated, multiple PDSN/FAs 312 may be connected to the IP network 310. The IP network 310 may be the Internet, an intranet, a private IP network, etc. Data is transmitted as Internet Protocol data packets ("IP packets") across the IP network 310. Many different kinds of data may be transmitted between a correspondent node 306 and a mobile node 302. For example, audio data, video data, textual data, electronic files, etc., may be communicated between the correspondent node 306 and the mobile node (MN) 302.

The PDSN/FA 312 receives and processes the IP data to transmit them to one or more Base Stations (BSs) 308. As shown, each PDSN/FA 312 is in electronic communication with one or more BSs 308. Once a BS 308 receives the data, it then sends the data to one or more MNs 302. An MN 302 corresponds to a mobile terminal 206 of FIG. 2. Each BS 308 may serve one or more MNs 302. Typically the BS 308 serves many MNs 302.

The foregoing information describes the particular embodiment of the system 100 as applied and used in a wireless communication system 200 as shown in FIG. 2. However, it will be appreciated by those skilled in the art that the inventive principles herein may be applied to other contexts where mobile IP may be deployed. Thus, the following description will use the more general terms of FIG. 1 rather than the more specific terms associated with the embodiment of FIG. 3.

Figure 4:
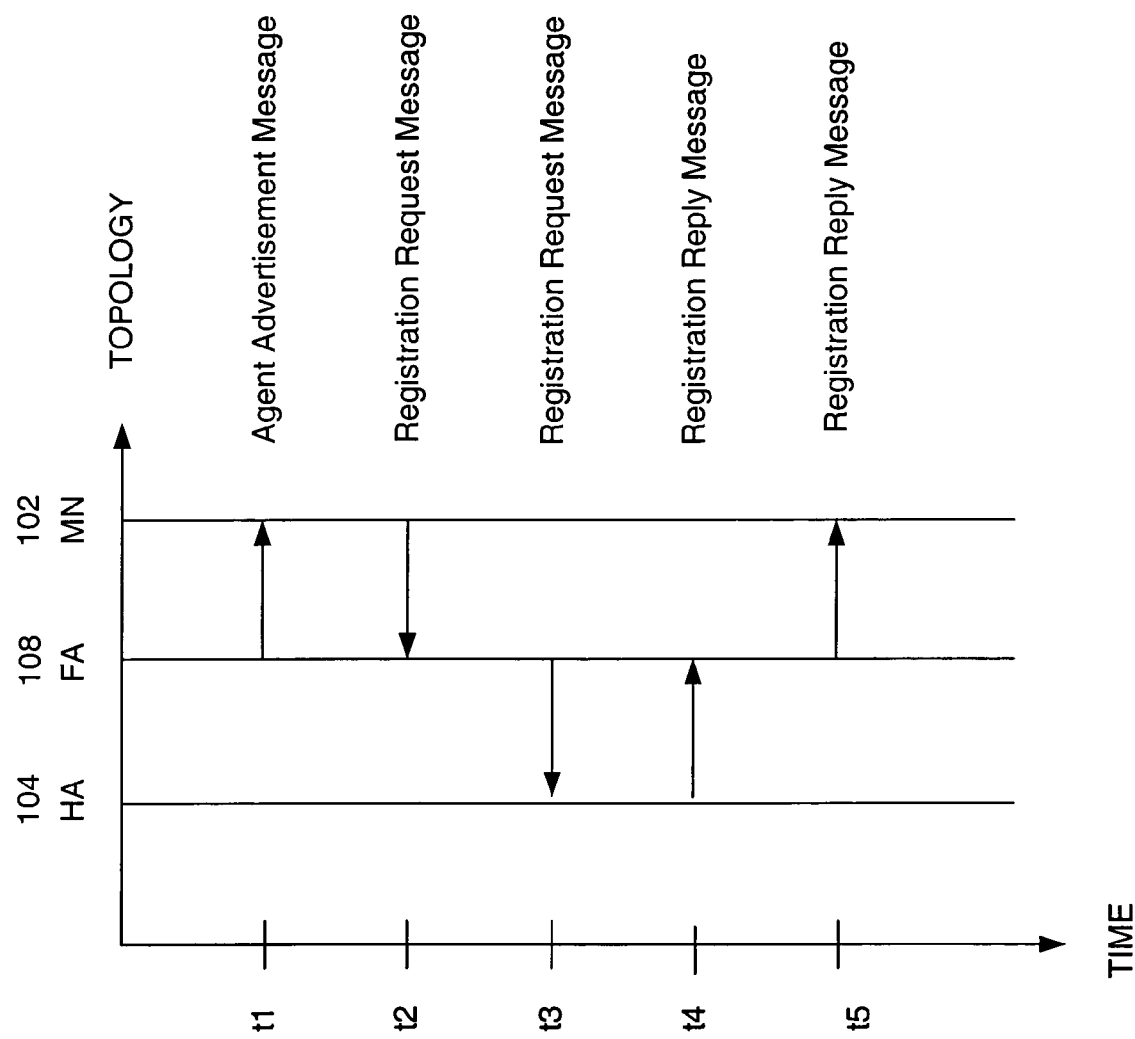
FIG. 4 illustrates a flow diagram for registering a mobile node with a home agent in a wireless communication system topology.

FIG. 4 illustrates a flow diagram when a foreign agent (FA) 108 advertises to a visiting mobile node (MN) 102 and receives a registration request message. The horizontal axis represents the topology of the system, i.e., infrastructure elements. The vertical axis represents the time line. At time t1 the foreign agent (FA) 108 sends an agent advertisement message. The mobile node (MN) 102 receives the agent advertisement and determines whether the mobile node 102 is on its home network 114 or on a foreign network 112. In the example shown by FIG. 4, the mobile node 102 determines that it is on a foreign network 112. In addition, the mobile node 102 may obtain a care-of address from the agent advertisement message. The care-of address is typically the IP address of the foreign agent 108. The mobile node 102 then registers the new care-of address with its home agent (HA) 104. The mobile node 102 may register the new care-of address with its home agent 104 by sending a registration request message to the foreign agent 108 at time t2. The foreign agent 108 then forwards the registration request message to the home agent 104 at time t3.

At time t4 the home agent (HA) 104 replies by sending a registration reply message to the foreign agent (FA) 108, which forwards this message to the mobile node (MN) 102 at time t5. The registration reply message indicates to the mobile node 102 whether the home agent 104 accepted the registration or not. If the home agent 104 accepts the registration, it the home agent 104 provides an IP address to the mobile node 102 and sends the IP address to the mobile node 102 in the registration reply message.

Figure 5:
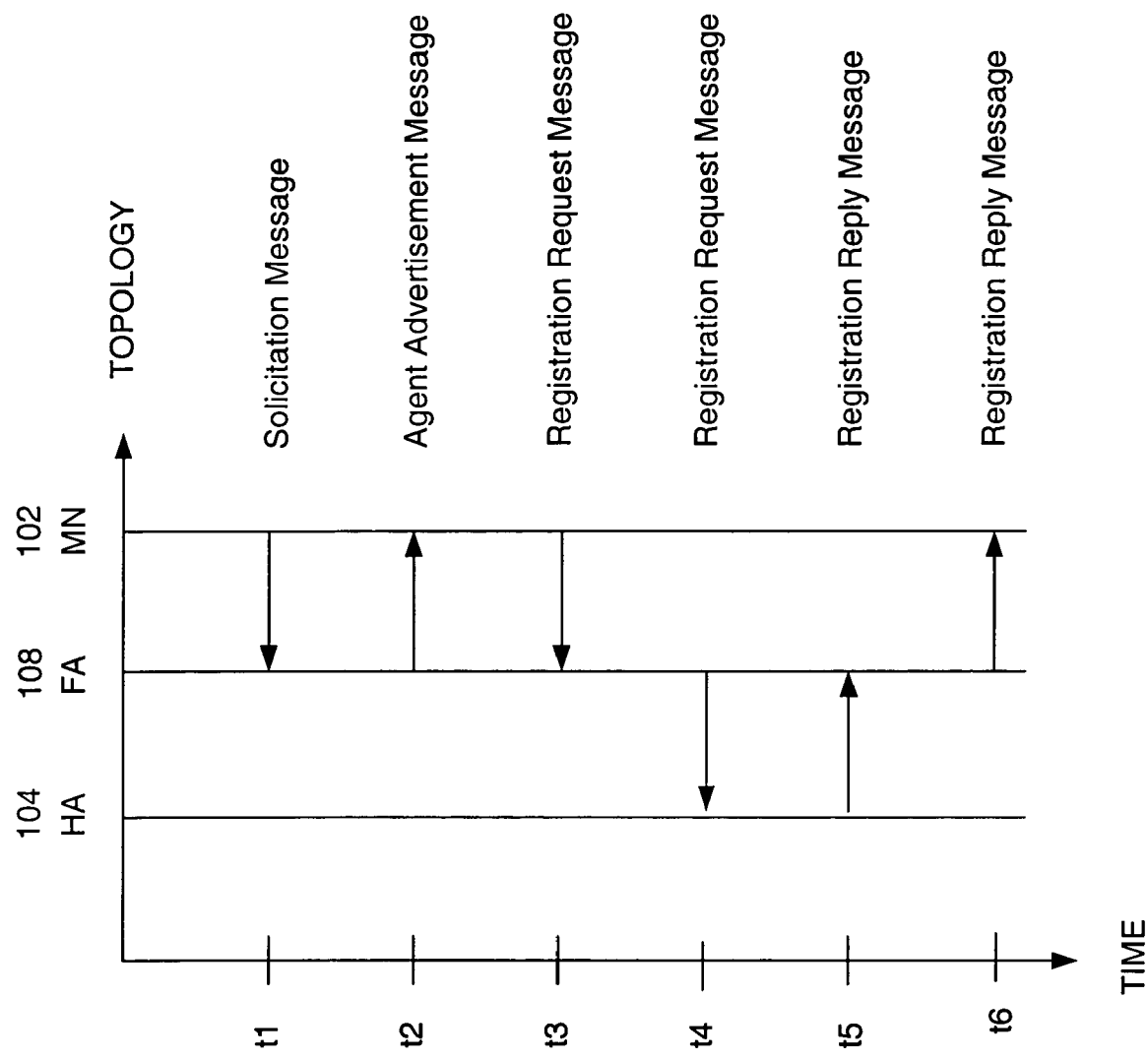
FIG. 5 illustrates another flow diagram for registering a mobile node with a home agent in a wireless communication system topology.

FIG. 5 illustrates a flow diagram similar to the flow diagram of FIG. 4 with the addition that the foreign agent (FA) 108 advertises after being prompted to advertise by the mobile node (MN) 102. The mobile node 102 may solicit an agent advertisement message by sending a solicitation message at time t1. The remaining actions illustrated in FIG. 5 are discussed in relation to FIG. 4.

The Internet Control Message Protocol ("ICMP"), as defined in RFC 792 which is incorporated herein by reference, may be used in sending messages with the embodiments disclosed herein. In addition, ICMP Router Discovery, defined in RFC 1256, which is incorporated herein by reference, may be used in the discovery of an agent, a home agent 104 or a foreign agent 108.

In the description herein, special extensions are added to the standard ICMP messages to communicate the needed messages. For example, one extension that is used is the mobility agent extension, which is used by the foreign agent 108 in sending the agent advertisement message. The agent advertisement message is known by those skilled in the art as an ICMP Router Advertisement.

The format for the mobility agent extension which is applied to the ICMP Router Advertisement is shown in FIG. 6. The TYPE 602 field indicates what type of extension it is. The LENGTH 604 field is the length of the extension. The LENGTH depends on the number of care-of addresses being advertised. The SEQUENCE NUMBER 606 field is used to identify the advertisement message. The LIFETIME 608 field indicates how long the information in the message is valid.

The FLAGS 610 field includes a number of flags to specify details about the agent, registration, etc. Currently the FLAGS are defined as follows: R indicates that registration with this foreign agent is required, B indicates that the foreign agent is busy, H indicates that the agent is a home agent, F indicates that the agent is a foreign agent, M indicates minimal encapsulation, G indicates GRE excapsulation and V indicates Van Jacobsen header compression.

The CARE-OF ADDRESSES 612 field includes the care-of address of the foreign agent 108. Some fields in the current format are RESERVED 614.

FIG. 7 is a block diagram illustrating the general format of a registration message. The registration request message and the registration reply message, shown in FIGS. 4 and 5, are both registration messages and have the format as shown in FIG. 7. A registration message includes IP HEADER FIELDS 702, a UDP HEADER FIELD 704, a MOBILE IP MESSAGE HEADER 706 and EXTENSIONS 708. Additional details regarding the registration request message and the registration reply message are discussed in relation to FIGS. 8 and 9.

The registration request message of FIGS. 4 and 5 has the format as shown in FIG. 8. The IP and UDP headers of the registration request are not shown in FIG. 8. The TYPE field 802 indicates the type of message. The message also includes FLAGS 804, and may also include additional reserved fields (not shown). The LIFETIME field 806 indicates how long the proposed request would be valid. The HOME ADDRESS 808 is the home address of the mobile node 102. The HOME AGENT 810 identifies the home agent 104 of the mobile node 102. The CARE-OF ADDRESS field 812 identifies the proposed care-of address. Typically this is the IP address of the foreign agent 108. The IDENTIFICATION field 814 is used for replay protection relating to security. EXTENSIONS 816 are also included.

The registration reply message of FIGS. 4 and 5 has the format as shown in FIG. 9. The TYPE field 902 indicates the type of message. The message also includes a CODE field 904 that describes the status of the registration. The registration may be accepted or it may fail. If it fails, the CODE field 904 indicates details about why the registration failed. The LIFETIME field 906 indicates to the mobile node 102 how long the registration will be honored by the home agent 104. The HOME ADDRESS 908 is the home address of the mobile node 102. The HOME AGENT 910 identifies the home agent 104 of the mobile node 102. The IDENTIFICATION field 912 is used for replay protection relating to security. EXTENSIONS 914 are also included.

When the home agent 104 accepts a registration request from a mobile node 102, it provides an IP address to the mobile node 102. When data is sent to the IP address provided to the mobile node 102, it will be routed to the home agent 104. FIG. 10 illustrates the routing of data sent from a correspondent node (CN) 106 to a mobile node (MN) 102 when the mobile node 102 is in a foreign network 112. The correspondent node 106 sends the data to the home address of the mobile node 102. This IP data arrives on the home network 114 via standard IP routing. The IP data is received by the home agent (HA) 104 at time t1. The home agent 104 then encapsulates the IP data to the care-of address, which delivers the IP data to the foreign agent (FA) 108 at time t2. The foreign agent 108 receives the IP data and de-tunnels the data to the mobile node 102 at time t3.

FIG. 11 illustrates the routing of IP data sent by the mobile node 102 to the correspondent node 106 when the mobile node 102 is in the foreign network 112. The mobile node 102 has an established Point-to-Point Protocol (PPP) connection 1102 with the foreign agent 108 and sends the IP data to the correspondent node 106 using the PPP connection 1102. In the implementation shown in FIG. 3, the PDSN/FA 312 acts as the mobile node's 302 default router and routes the IP data to the correspondent node 306.

The home agent 104 stores information describing its mobile nodes 102 so that it can route data to the mobile node 102. The mobile node 102 consumes resources of the home agent 104. Various kinds of resources are consumed at the home agent 104 in support of a mobile node 102. For example, typically the home agent 104 assigns an IP address for the mobile node 102 when the mobile node 102 requests registration. As more and more IP addresses are issued by the home agent 104, fewer additional IP addresses are available. Thus, IP addresses are one resource that may be consumed at the home agent 104. Processing power is another resource found at the home agent 104. The amount of memory and/or storage is another resource of the home agent 104 that is consumed as more mobile nodes 102 register with the home agent 104. Because the resources of the home agent 104 are finite, it would be beneficial for the home agent 104 to be able to reclaim or recapture resources when they are no longer needed.

Mobile IP de-registration has been proposed as a means to reclaim home agent 104 resources. When de-registration is used, the mobile node 102 sends a Mobile IP Registration Request (RRQ) message with the lifetime field set to a value of zero to the home agent 104 when the mobile node 102 is ready to end a mobile IP session. In some circumstances, a mobile node 102 may not be able to send a de-registration message at the end of a mobile IP session. One example of such a situation is when the mobile node 102 travels outside of the coverage area before sending the de-registration message. Another example is when a user at the mobile node 102 powers down before ending the mobile IP session. A further example may be when the mobile node 102 encounters a bad coverage area and is unable to send a de-registration message.

Even when the mobile node 102 is able to send a de-registration message, there may be disadvantages in sending the de-registration message. For example, if the mobile node 102 is dormant when it decides to end the mobile IP session and send the de-registration message, the mobile node 102 would need to set up a traffic channel to end the session. Setting up a traffic channel simply to end the mobile IP session is an expensive and inefficient use of the air interface. Knowing this, users may simply power down the mobile node 102 when they no longer need to use the service.

In these situations where de-registration is not possible or is undesirable, the resources reserved for the mobile node 102 at the home agent 104 are not reclaimed by the home agent 104 until the registration lifetime associated with a mobility binding expires. The following description is an alternative to de-registration that enables the resources of the home agent 104 to be reclaimed when the home agent 104 starts to run out of such resources.

FIG. 12 is a block diagram of an embodiment of a home agent 1204 that may be used with the embodiments herein. The home agent 1204 includes mobility bindings 1206. The mobility bindings 1206 store information about each mobile node 102 that has registered with the home agent 1204. The mobility bindings 1206 include one or more records of data where each record describes a mobile node 102. Each record includes a HOME ADDRESS 1208 which is the IP address issued to a mobile node 102 when it registers with the home agent 104. The CARE-OF ADDRESS 1210 is the address of the foreign agent 108 where the mobile node 102 is located. The home agent 104 obtains the CARE-OF ADDRESS 1210 from the registration request message sent by the mobile node 102. The LIFETIME 1212 indicates how long the HOME ADDRESS 1208 will be valid.

According to the exemplary embodiment, a timer is used to monitor communication between a home agent 104 and mobile node 102. The timer is an INACTIVITY TIMER 1214, which tracks the amount of time since the last communication with the mobile node 102. The home agent 104 tracks the activity of every mobile node 102 that has a binding in the mobility bindings 1206. When a home agent 104 receives a registration request message from a mobile node 102 and accepts the registration, the home agent 104 generates the HOME ADDRESS 1208 for the mobile node 102, adds a record to the mobility bindings 1206 for the mobile node 102, and sets the INACTIVITY TIMER 1214 to a preconfigured value D. Once the INACTIVITY TIMER 1214 is set, the timer 1214 decreases until it expires or is reset. The home agent 104 may reset the INACTIVITY TIMER 1214 when it forwards any data to or receives data from the mobile node 102. If the home agent 104 receives a destination host unreachable error (which is in the form of an ICMP error) in response to any data forwarded to the mobile node 102 by the home agent 104, the home agent 104 expires the mobile node's 102 INACTIVITY TIMER 1214.

Figure 13:
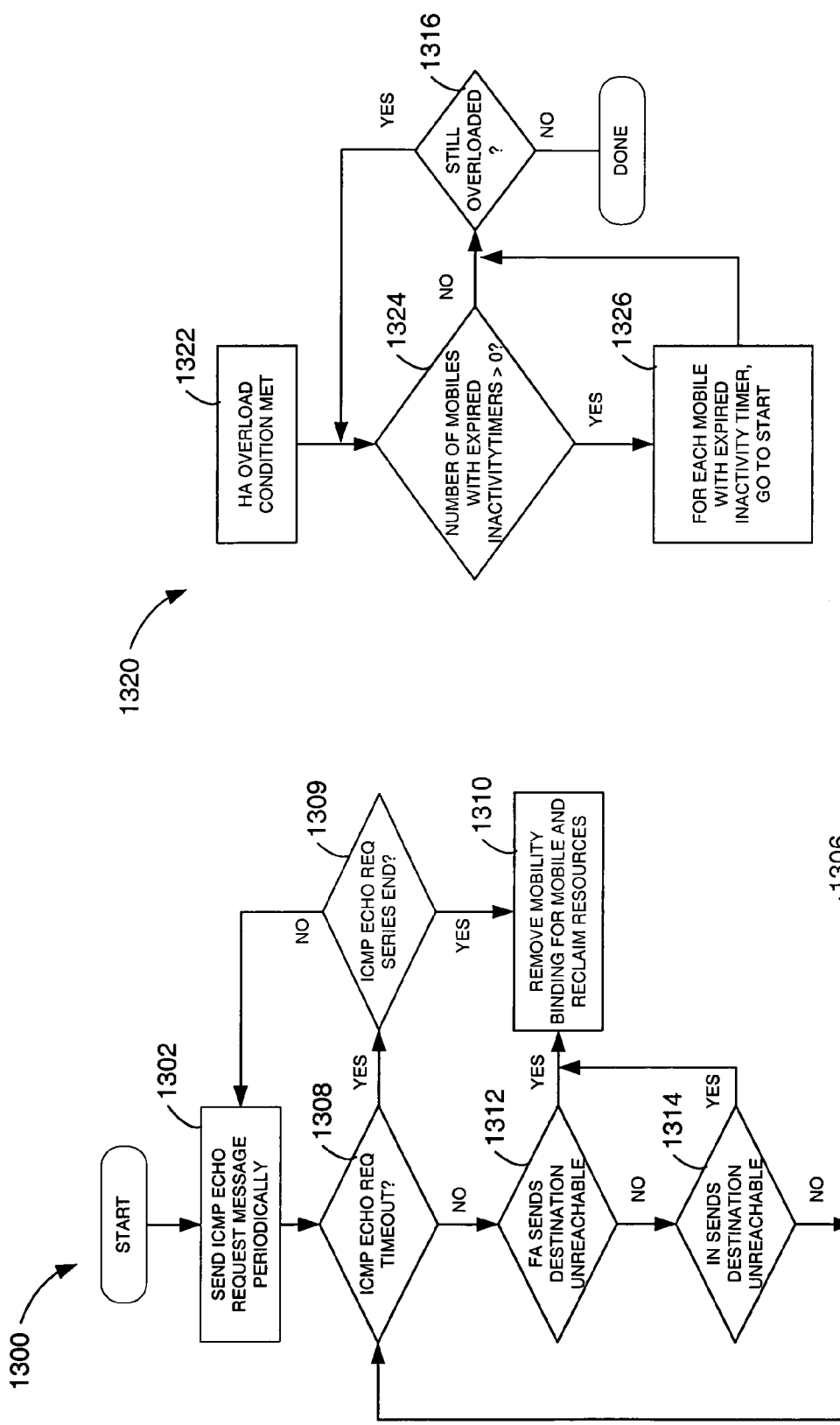
FIGS. 13A and 13B are flow diagrams of a method for the home agent to reclaim resources.

FIGS. 13A and 13B illustrate in flow diagram form of a method 1300 for the home agent 104 to reclaim resources. The method 1300 may be triggered when the home agent 104 starts to run out of needed resources or when it becomes overloaded. Depending on what resources are being monitored by the home agent 104 and depending on the implementation of the embodiments herein, an overload condition may be defined in a variety of ways. Those skilled in the art will appreciate how to determine that a particular load on certain resources constitutes an overload condition for the home agent 104. The method 1300 of FIG. 13A is started when the home agent 104 has entered an overload condition, and the method 1300 is followed for each mobile node 102 whose INACTIVITY TIMER 1214 has expired. The home agent 104 may run the sequence of steps in parallel for each mobile node 102, it may stagger the steps for each mobile node 102, or it may sequentially iterate through each mobile node 102 whose NACTIVITY TIMER 1214 has expired thereby starting a new processing thread for that mobile node 102.

The home agent 104 sends 1302 a series of ICMP echo request messages to the mobile node 102 to determine the status of the mobile node 102. In effect, the home agent 104 pings the mobile node 102. The ping frequency is typically set to a small value (e.g., two per minute) and the number of pings in a series is configurable (e.g., from five to ten). The time between pings is usually set to a value slightly greater than it would take to set up a traffic channel, thereby ensuring that the ping does not time out when the mobile node 102 is dormant.

The sending of the echo request messages to all the mobile nodes 102 with an expired inactivity timer 1214 may be staggered. Depending on the implementation, sending all the echo request messages at the same time could result in a greater stress on the home agent 104, which is already in an overloaded condition.

If all the ICMP echo request messages timeout 1308 and the ICMP echo sequence or series has completed 1309, the home agent 104 removes 1310 the mobility binding for the particular mobile node 102 and reclaims the resources associated with the mobile node 102.

If the home agent 104 receives 1312 an ICMP destination host unreachable error from the foreign agent 108 in response to any ICMP echo request message, the home agent 104 removes 1310 the mobility binding for the particular mobile node 102 and reclaims the resources associated with the mobile node 102. In addition, if the home agent 104 receives 1314 an ICMP destination host unreachable error from any node (an intervening node) other than the foreign agent 108 in response to the last ICMP echo request message of the series of ICMP echo request messages sent to the mobile, the home agent 104 removes 1310 the mobility binding for the particular mobile node 102 and reclaims the resources associated with the mobile node 102.

If the home agent 104 receives 1304 an ICMP echo reply message in response to any ICMP echo request sent to a mobile node, the home agent 104 resets 1306 the mobile node's INACTIVITY TIMER 1214 to D and discontinues sending ICMP echo request messages to that mobile node 102. Else, processing waits for the ICMP echo timeout 1308.

Continuing with FIG. 13B, when an HA overload condition is met 1322, the home agent 104 determines if the number of mobiles having expired inactivity timers is greater than zero 1324. The home agent 104 determines if an overload condition still exists 1316 and may continue the reclaiming process 1300 as defined herein. For each mobile node 102 with an expired INACTIVITY TIMER 1214, the process 1300 of FIG. 13A is initiated 1326. Note that multiple processes 1300 may be performed in series or in parallel. In one embodiment, multiple processes are performed in parallel, wherein the timing for each process (for each mobile node 102) is staggered to allow the home agent 104 time to adjust to the condition of each connection.

Figure 14:
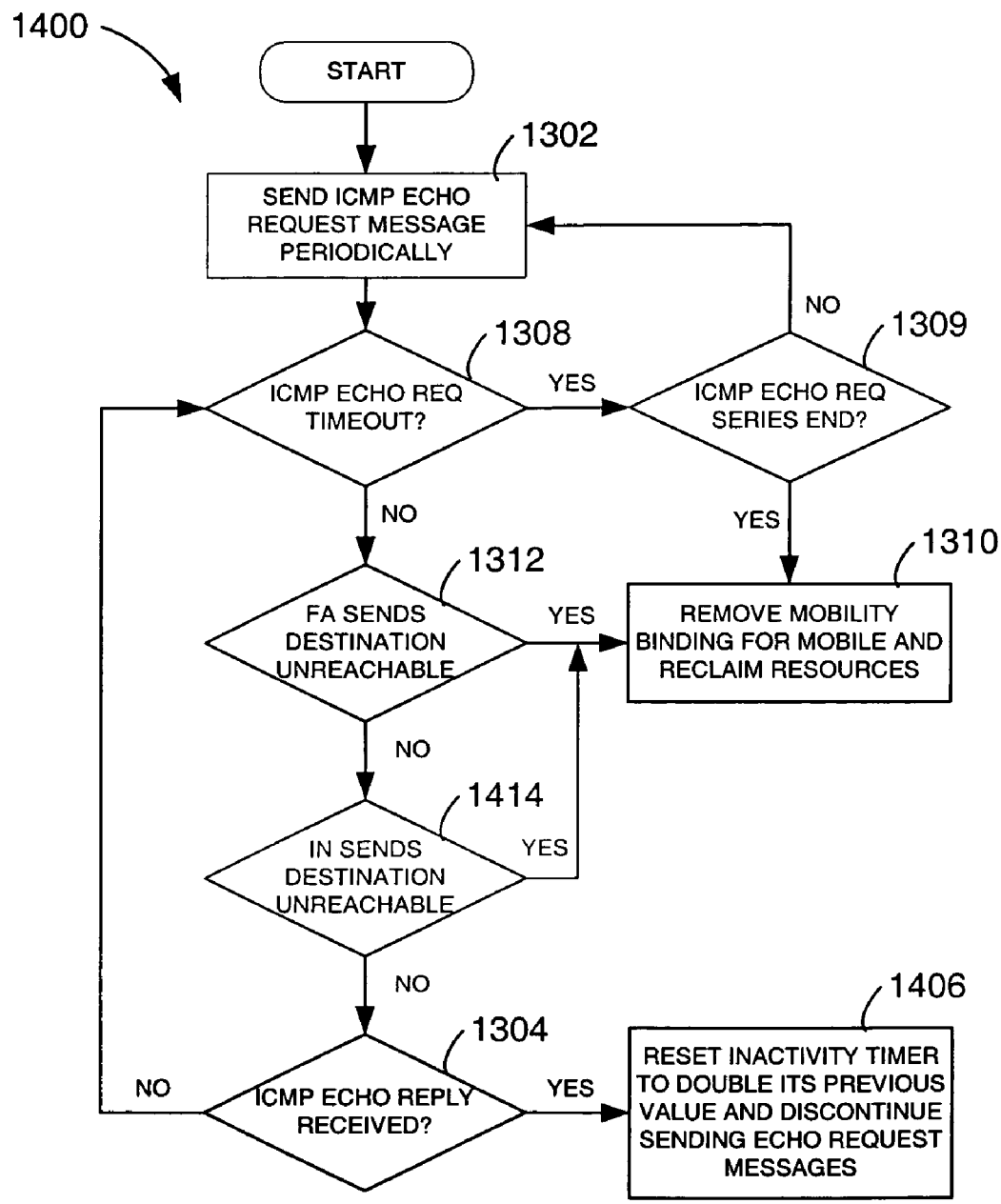
FIG. 14 is another flow diagram of a method for the home agent to reclaim resources.

Various changes may be made in the method 1300 shown in FIG. 13A without detracting from the scope of the inventive principles herein. FIG. 14 illustrates a flow diagram of another method 1400 for the home agent 104 to reclaim resources. The method 1400 of FIG. 14 is similar to the flow diagram of FIG. 13A with the following modifications.

If the home agent 104 receives 1304 an ICMP echo reply message in response to any ICMP echo requests, the home agent 104 resets 1406 the mobile node's inactivity timer 1214 to double the previous value of the inactivity timer and discontinues sending ICMP echo request messages to that mobile node 102. In the flow diagram 1300 of FIG. 13A the timer 1214 was set to the same value (D) every time. Setting the timer 1214 to double the previous value in this method may ensure that a dormant mobile is not woken up too frequently (i.e., periodically) when the home agent 104 is overloaded.

Further down in the method 1400, if the home agent 104 receives 1414 an ICMP destination host unreachable error from any node (an intervening node) other than the foreign agent 108 in response to any ICMP echo request message, the home agent 104 removes 1310 the mobility binding for the particular mobile node 102 and reclaims the resources associated with the mobile node 102. In FIG. 13A the unreachable error was in response to the last ICMP echo request message, rather than any ICMP echo request message. It may be more optimal to wait for an ICMP error in response to the last request instead of any request, as this allows the home agent 104 to wait for any potential momentary network partitions to be rectified. The process 1320 of FIG. 13B may also be used with the process 1400 of FIG. 14, wherein the home agent 104 determines if an overload condition still exists 1316 and may continue the reclaiming process 1400 as define herein.

As discussed briefly above, those skilled in the art may determine when a home agent's 104 resources are being overloaded. There are many different ways in which this may be accomplished. Methods may be used that are implementation specific. One possible way in which the overload condition may be determined and handled is illustrated in FIGS. 15 and 16.

Figure 15:
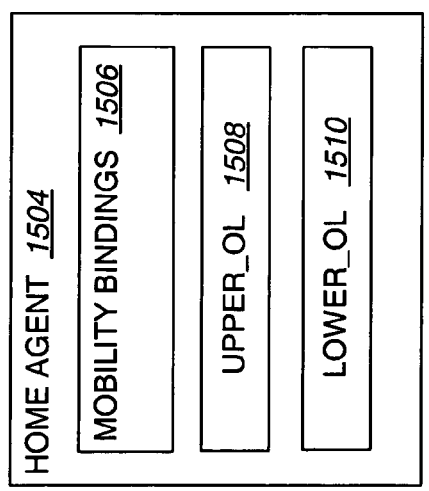
FIG. 15 is a block diagram of an embodiment of a home agent that includes an upper overload condition and a lower overload condition.

FIG. 15 is a block diagram of a home agent 1504 with mobility bindings 1506 as well as UPPER_OL data 1508 and LOWER_OL data 1510. The mobility bindings 1506 are as discussed herein. UPPER_OL data 1508 is a value that is the upper limit for an overload condition. LOWER_OL data 1510 is a value that is the lower limit for an overload condition. These values 1508, 1510 may be used as discussed in relation to FIG. 16.

Figure 16:
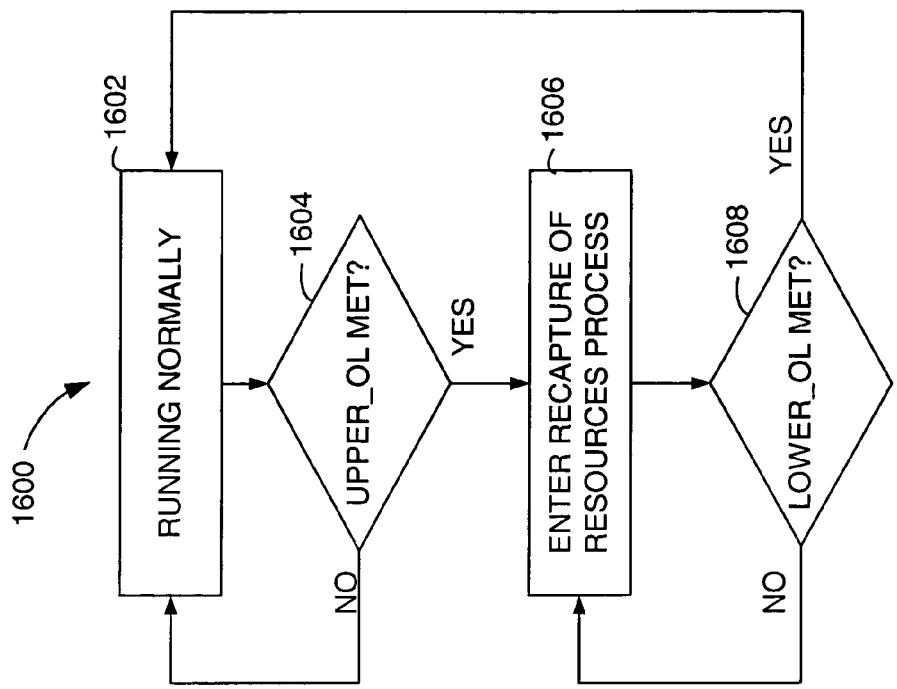
FIG. 16 is a flow diagram of a method for determining when a home agent is to enter a recapture of resources process.

FIG. 16 is a flow diagram of a method 1600 for determining when a home agent 1504 is to enter a recapture of resources process. To begin the method 1600, the home agent 1504 is assumed to be running 1602 normally. Periodically the home agent 1504 checks its current operating conditions and compares 1604 them with the UPPER_OL data 1508. If the UPPER_OL 1508 has been met or exceeded, the home agent 1504 enters 1606 the recapturing of resources process as discussed herein. If the UPPER_OL 1508 has not been met, the home agent 1504 simply continues running 1602 normally.

During the recapturing of resources process, the home agent 1504 compares 1608 its current operating conditions with the LOWER_OL data 1510. If the resources are at the LOWER_OL 1510 level or lower, the home agent 1504 may discontinue the recapturing process and return to its normal processing state 1602. If the resources are still above the LOWER_OL 1510 level, the home agent 1504 continues the recapturing process.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A home agent for use in a wireless communication system supporting mobile Internet Protocol (IP), the home agent comprising:
a plurality of mobility bindings, wherein each mobility binding comprises:
a home address provided by the home agent for use by a corresponding mobile node;
a care-of address received from the corresponding mobile node when the corresponding node sends a registration request message;
a lifetime value defining a term of validity for the home address; and an inactivity timer to monitor an activity status of the corresponding mobile node, wherein the home agent is configured to create the inactivity timer for the corresponding mobile node when the mobility binding is created for the corresponding mobile node; and
a resource condition that represents a current capacity of a home agent resource, wherein the home agent is configured to enter a resource reclaiming process when the resource condition satisfies an overload condition, wherein the resource reclaiming process searches each mobility binding of the plurality of mobility bindings for expired inactivity timers, and for each mobility binding with an expired inactivity timer the home agent implements a method comprising sending a series of echo request messages to the mobile node from the mobility binding with the expired inactivity timer.

2. The home agent as in claim 1, wherein the method further comprises reclaiming the portion of the home agent resource if the home agent receives a destination host unreachable error from an intervening node in response to a last echo request message of the series of echo request messages.

3. The home agent as in claim 1, wherein the method further comprises reclaiming the portion of the home agent resource if the home agent receives a destination host unreachable error from a foreign agent node in response to any echo request message of the series of echo request messages.

4. The home agent as in claim 1, wherein the method further comprises reclaiming the portion of the home agent resource if the home agent receives a destination host unreachable error from an intervening node in response to any echo request message of the series of echo request messages.

5. The home agent as in claim 4, further comprising data that defines a lower limit of the overload condition.

6. The home agent as in claim 1, wherein the method further comprises resetting the expired inactivity timer if an echo reply message is received in response to any of the request messages of the series of echo request messages.

7. The home agent as in claim 1, wherein the method further comprises reclaiming a portion of the home agent resource if all of the echo request messages timeout.

8. The home agent as in claim 1, further comprising data that defines an upper limit of the overload condition.

9. The home agent as in claim 8, wherein the home agent is further configured to enter the resource reclaiming process when the resource condition satisfies the overload condition defined by the data that defines an upper limit of the overload condition.

10. The home agent as in claim 9, wherein the home agent is further configured to continue the resource reclaiming process until the resource condition is lower than the overload condition defined by data that defines a lower limit of the overload condition.

11. The home agent as in claim 1 wherein the resource condition relates to availability of IP addresses.

12. A home agent for use in a wireless communication system supporting mobile Internet Protocol (IP), wherein the home agent is configured to implement a method comprising:

storing a plurality of mobility bindings, wherein each mobility binding corresponds to an individual mobile node, and wherein each mobility binding comprises:
a home address provided by the home agent for use by the individual mobile node;
a care-of address received from the individual mobile node and used by the home agent to forward data to the individual mobile node; and
an inactivity timer to monitor an activity status of the corresponding mobile node;
monitoring a resource condition that represents a current capacity of a home agent resource, and starting a resource reclaiming process when the resource condition satisfies an overload condition;
wherein the resource reclaiming process searches each mobility binding of the plurality of mobility bindings for expired inactivity timers, and for each mobility binding with an expired inactivity timer the home agent sends a series of echo request messages to the individual mobile node.

13. The home agent as in claim 12, wherein the resource reclaiming process reclaims a portion of the home agent resource if the home agent receives a destination host unreachable error from an intervening node in response to the last echo request message of the series of echo request messages.

14. The home agent as in claim 12, wherein the resource reclaiming process reclaims a portion of the home agent resource if the home agent receives a destination host unreachable error from an intervening node in response to any echo request message of the series of echo request messages.

15. The home agent as in claim 12, wherein the resource reclaiming process reclaims a portion of the home agent resource if the home agent receives a destination host unreachable error from a foreign agent node in response to any echo request message of the series of echo request messages.

16. The home agent as in claim 12, wherein the resource reclaiming process resets the expired inactivity timer if an echo reply message is received in response to any of the echo request messages of the series of echo request messages.

17. The home agent as in claim 12, wherein the resource reclaiming process reclaims a portion of the home agent resource if all of the echo request messages timeout.

18. The home agent as in claim 12, further comprising an upper limit of the overload condition.

19. The home agent as in claim 18, further comprising a lower limit of the overload condition.

20. The home agent as in claim 19, wherein the home agent starts the resource reclaiming process when the resource condition satisfies the overload condition defined by the upper limit.

21. The home agent as in claim 20, wherein the home agent continues the resource reclaiming process until the resource condition is lower than the overload condition defined by the lower limit.

22. The home agent as in claim 12 wherein the resource condition relates to availability of IP addresses.

23. In a wireless communication system supporting mobile Internet Protocol (IP), a method comprising:
receiving a registration request message at a home agent from a mobile node wherein the registration request message includes a care-of address;
creating a mobility binding for the mobile node at the home agent, wherein the mobility binding comprises:
a home address provided by the home agent for use by the mobile node;
the care-of address; and
an inactivity timer to monitor an activity status of the mobile node;
entering an overload condition at the home agent;
starting a reclaiming resources process at the home agent if the inactivity timer has expired; and
sending a series of echo request messages to the mobile node when the inactivity timer has expired.

24. The method as in claim 23, further comprising reclaiming a resource of the home agent if the home agent receives a destination host unreachable error from a foreign agent node in response to any echo request message of the series of echo request messages.

25. The method as in claim 23, further comprising reclaiming a resource of the home agent if the home agent receives a destination host unreachable error from an intervening node in response to the last echo request message of the series of echo request messages.

26. The method as in claim 23, further comprising reclaiming a resource of the home agent if the home agent receives a destination host unreachable error from an intervening node in response to any echo request message of the series of echo request messages.

27. The method as in claim 23, further comprising resetting the inactivity timer if an echo reply message is received in response to any of the echo request messages of the series of echo request messages.

28. The method as in claim 23, further comprising reclaiming a resource of the home agent if all of the echo request messages timeout.

29. The method as in claim 23, wherein the overload condition is entered based on an upper limit.

30. The method as in claim 29, further comprising ending the reclaiming resources process at the home agent based on a lower limit.

31. The method as in claim 23, wherein the reclaiming resources process releases processing resources.

32. The method as in claim 23, wherein the reclaiming resources process reclaims IP addresses.

33. The method as in claim 23, wherein the reclaiming resources process reclaims memory.

34. In a wireless communication system supporting mobile Internet Protocol (IP), a method comprising:
receiving a registration request message at a home agent wherein the registration request message includes a care-of address;
providing a home address for a mobile node;
associating the home address with the care-of address;
providing an inactivity timer for the mobile node at the home agent;
monitoring a condition of the home agent;
starting a reclaiming resources process at the home agent through use of the inactivity timer for the mobile node when the condition satisfies an overload condition; and
sending a series of echo request messages to the mobile node when the condition satisfies the overload condition and when the inactivity timer for the mobile node is expired.

35. The method as in claim 34, further comprising reclaiming a resource of the home agent if the home agent receives a destination host unreachable error from a foreign agent in response to any echo request message of the series of echo request messages.

36. The method as in claim 34, further comprising reclaiming a resource of the home agent if the home agent receives a destination host unreachable error from an intervening node in response to a last echo request message of the series of echo request messages.

37. The method as in claim 34, further comprising reclaiming a resource of the home agent if the home agent receives a destination host unreachable error from an intervening node in response to any echo request message of the series of echo request messages.

38. The method as in claim 34, further comprising resetting the inactivity timer for the mobile node if an echo reply message is received in response to any of the echo request messages of the series of echo request messages.

39. The method as in claim 34, wherein the reclaiming resources process is started when the condition satisfies the overload condition defined by an upper limit.

40. The method as in claim 39, further comprising continuing the reclaiming resources process until the condition is lower than a lower limit.

41. The method as in claim 34, further comprising reclaiming a resource of the home agent if all of the echo request messages timeout.

42. The method as in claim 1 wherein the condition relates to availability of IP addresses.

43. A home agent for use in a wireless communication system supporting mobile Internet Protocol (IP), the home agent comprising:
   means for servicing registration requests from mobile nodes;
   means for providing home addresses to the mobile nodes;
   means for binding the home addresses to care-of addresses;
   means for monitoring the activity of each mobile node individually;
   means for monitoring a resource condition that represents a current capacity of a home agent resource;
   means for reclaiming the home agent resource when the resource condition is overloaded; and
   means for sending a series of echo request messages to each mobile node with no activity during a period of time.

* * * * *